United States Patent Office
3,808,339
Patented Apr. 30, 1974

3,808,339
INSECT REPELLENT COMPOSITIONS AND PROCESS CONTAINING N-(DIALKYLAMINOALKOXY) ALKYL TERPENYLAMINE
Carl Bordenca, Pointe Vedra Beach, Fla., assignor to SCM Corporation, Cleveland, Ohio
No Drawing. Continuation-in-part of application Ser. No. 851,770, July 22, 1969, now Patent No. 3,703,554, dated Nov. 21, 1972. This application July 31, 1972, Ser. No. 276,846
The portion of the term of the patent subsequent to Nov. 21, 1989, has been disclaimed
Int. Cl. A01n 9/20, 9/24
U.S. Cl. 424—325         12 Claims

ABSTRACT OF THE DISCLOSURE

Certain N - (dialkylaminoalkoxy)alkyl terpenylamines effectively repel insects including biting flies from substrates and from the skin of live animals.

BACKGROUND OF THE INVENTION

This application is a continuation-in-part of copending application Ser. No. 851,770, filed on July 22, 1969, now U.S. 3,703,554. This invention relates to insect repellent compositions and process wherein the active ingredient comprises certain repellent mono and diterpenylamines.

The instant invention is based on our discovery that mono and diterpenylamines further N-substituted with dialkylaminoalkoxyalkyl substituents are effective insect repellents and repel biting insects, including biting flies, from the skin of animals including humans.

SUMMARY OF THE INVENTION

In one aspect, our invention is an insect repellent composition comprising an inert carrier and from about 0.01 to 90 percent by weight of an N-[(dialkylaminoalkoxy) alkyl]terpenyl amine wherein:
said alkyl group contains 1–6 carbon atoms;
said alkoxy group contains 1–4 carbon atoms;
said dialkyl portion is two $C_{1-4}$ alkyl radicals or two $C_{1-4}$ alkyl radicals conjoined by a carbon-to-carbon bond or by an oxygen to form with the nitrogen atom to which they are attached a 5- or 6-membered heterocyclic ring;
and said terpenyl group or groups are acyclic terpenyl.

Another aspect is a process for protecting the skin of a live animal including that of a human from biting insects including biting flies which comprises applying a minute but repellent amount of such terpenyl amine thereon.

Application dosages suitably are from 5 to 55 mg. per square foot of the substrate exposed to insects, and can vary somewhat from this depending upon the degree of repellency desired, the insect to be repelled, climate and expected exposure. The repellent effect is surprisingly long-lasting. A further aspect is a process for repelling insects from a substrate which comprises applying to said substrate an insect repelling amount of the instant active terpenyl amine. Application dosages are suitably from about 5 to 500 mg. per square foot of substrate exposed to insects.

Insect repellent compounds of this invention can be represented by the formula:

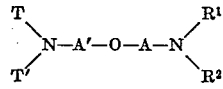

wherein
T is an acyclic (mono) terpenyl radical;
T' is hydrogen or an acyclic (mono) terpenyl radical;
A is a $C_{1-4}$ alkylene radical preferably ethylene;
A' is a $C_{1-6}$ alkylene radical, preferably an ethylene radical further substituted with one, two or three methyl groups;
$R^1$ and $R^2$ when taken separately are like or dissimilar alkyl radicals containing from 1 to 4 carbon atoms;
$R^1$ and $R^2$ when taken together are two $C_{1-4}$ alkyl radicals cojoined by a carbon-to-carbon bond or by an oxygen to form with the nitrogen atom, to which they are attached, a 5- or 6-membered heterocyclic ring.

Thus, the instant insect repellents can be named either as an ethers (as was done in the parent application, Ser. No. 851,770) or can be named as N-substituted mono terpenyl and diterpenyl amines.

Although either nomenclature system is correct, we prefer in this application, which is considerably less scope than the parent application, to use the latter terminology for simplicity. In this fashion, the above depicted compounds will be named with the amine as the principal component as N - [(dialkylaminoalkoxy)alkyl]terphenylamine and N-[(dialkylaminoalkoxy)alkyl] diterpenylamine.

Acyclic terpenyl groups include, for example, geranyl, neryl, citronelyl, bupleuryl, lavandulyl, linalyl, and myrcenyl. Advantageous and preferred compounds are those where T and T' represents geranyl and linalyl. For economy and ease of synthesis, it is preferred that T and T' be identical terpenyl group.

Advantageous (dialkylaminoalkoxy) alkyl groups for our purposes include (dimethyl and diethylaminoethoxy) alkyl groups for efficiency and economy. Particularly preferred are the 2-(diethylaminoethoxy)-2-methylethyl and 2-(diethylaminoethoxy)-1,1-dimethylethyl groups.

Specific compounds which are secondary amines and which are useful in the practice of this invention include the following listed amines and their neryl, linalyl, and citronellyl counterparts:

N-[1,1-dimethyl-2-(diethylaminoethoxy)ethyl]geranylamine
N-[2-(diethylaminoethoxy)ethyl]geranylamine
N-[2-methyl-2-(diethylaminoethoxy)ethyl]geranylamine
N-[1-ethyl-2-(diethylaminoethoxy)ethyl]geranylamine
N-[3-(diethylaminoethoxy)propyl]geranylamine
N-[1,1-dimethyl-2-(dimethylaminoethoxy)ethyl] geranylamine
N-[1,1-dimethyl-2-(morpholinoethoxy)propyl] geranylamine
N-[1,1-dimethyl-2-(1'-piperidinoethoxy)ethyl]geranylamine
N-[1-methyl-2-(1'-pyrolidinoethoxy)ethyl]geranylamine Specific compounds which are tertiary amines and which are useful in the practice of this invention are the following listed amines and their neryl, linalyl, and citronellyl counterparts:

N-[1,1-dimethyl-2-(diethylaminothoxy)ethyl]digeranylamine
N-[2-(diethylaminoethoxy)ethyl]digeranylamine
N-[2-methyl-2-(diethylaminoethoxy)ethyl]digeranylamine
N-[1-ethyl-2-(diethylaminoethoxy)ethyl]digeranylamine
N-[3-(diethylaminoethoxy)propyl]digeranylamine
N-[3-(1'-piperidinopropoxy)propyl]digeranylamine One synthetic method for the preparation of the compounds of this invention comprises heating the desired hydrocarbyl halide (i.e., terpenyl halide) with the (dialkylaminoalkoxy) alkyl amine, such as, for example, 1,1-dimethylethyl - 2 - (diethylaminoethoxy)ethyl amine, 2-methyl - 2-(dimethylaminoethoxy)ethyl amine, or 3-(1'-piperidinoethoxy)propyl amine at a temperature in the range from 40° C. to 160° C. in the presence of an acid acceptor.

If desired, an excess of the amine can be used as the acid acceptor. The reaction is preferably carried out in an organic solvent inert under the conditions of the reaction. For example, methanol, ethanol, propanol, and higher alcohol and ethers may be used, but hydrocarbons, such as benzene, xylene, and the like are generally preferred. The acid acceptor generally is a basic substance which forms water-soluble by-products with the evolved hydrogen halide which are easily separable from the main reaction product.

Alternatives to using an excess of the amine as the hydrogen halide acceptor include the use of tertiary amines such as triethylamine or pyridine. Frequently when a hydrocarbon solvent is used, the by-product amine hydrochloride will be an insoluble solid which can be easily removed from the reaction product by filtration. Work-up in this case is conveniently carried out by filtering the amine hydrochloride, washing the remaining organic phase with water, evaporating the solvent and distilling the product. In some cases where the products are solids, recrystallization is preferred to distillation.

Another preferred synthetic approach is to first synethsize the corresponding terpenyl aminoalcohol, such as, for example, 2 - (digeranylamine)-2,2 - dimethylethanol, from the terpenyl halide and the aminoalkanol in a manner similar to the procedure described above. The sodium salt of such alcohol, prepared in an inert solvent, such as benzene, using metallic sodium is then reacted with a solution of dialkylaminoalkylhalide (i.e., diethylaminoethyl chloride) in the same solvent. After filtration of the by-product sodium halide and removal of the solvent, the desired (dialkylaminoalkoxy) alkyl terpenyl amine is isolated and purified.

The foregoing compounds range from high-boiling liquids to low-melting solids and have limited water solubility. They can be made water soluble by reacting them with a suitable acid, such as, for example, hydrochloric, sulfuric or phosphoric acid to convert the compounds into the corresponding amine acid salt. Under such circumstances the carrier can be water. It is contemplated that both the terpenyl amines and their water-soluble salts will be useful in the practice of this invention.

The term "applying to a substrate" should be understood as any method or process by which the said repellent is brought into contact with the said substrate either penetratingly or superficially. Such surfaces include, for example, growing plants, manufactured products, clothing, webs, and similar devices which might be used in an insect environment. Implied herein are the typical applications, techniques, and formulations commonly employed by those skilled in the use and formulation of insect repellents and pesticides including areas of medicine and veterinary applications to animals and the like and to locus and surroundings where pesticidal protection is desired. Further, by definition, the term includes the designations contact, deposit, soak, place, permeate, impregnate, invest, coat, treat, surround, cover and like terms. Such deposits would include sprays, lotions, powders, coatings, paints, varnishes, lacquers, and would also imply the finished substrate whether or not other prior or subsequent treatments are commonly made thereto.

Typical repellent compositions will contain advantageously between about 0.1 and about 50 and in some instances 0.1–25 weight percent of one or more of the compounds herein defined, the carrier often being fugitive on exposure or dilutable with innocuous diluents such as water.

A wide spectrum of insects such as, for example, ticks, flour beetles, moths, houseflies, stable and other biting flies, such as horn flies, horse flies, and deer flies, chiggers, ants, cockroaches, mosquitoes, and the like can be repelled effectively for prolonged periods of time, e.g., up to a month or even longer in some cases.

The carrier employed can be any carrier conventionally used in insect-repellent formulations with the proviso that the carrier should be inert; that is, it should be incapable of undergoing a chemical reaction with the compound employed. The carrier should also be one that will not be harmful to the environment in which it is employed. Hence intermediates, unreacted excess reactants or reagents, by-products of reaction and solvents containing such generally extraneous chemical material definitely are not a part of the inventive compositions, the latter being fairly commercially pure compounds, e.g., 85 percent or above with only innocuous diluents, admixed with acceptable carriers for the use. Thus, some agricultural applications can tolerate the common commercially pure admixtures, while applications to animal or human skin demand quite high purities of admixture.

When it is desired to render packaging material, such as, for example, boxes, repellent to cockroaches or beetles the insect-repellent compounds or compositions should be used in sufficient amount to leave an effective layer or residue on the surface of the packaging material. The effective amount of compound to be deposited on the substrate to be made repellent will depend to some extent on the character of carrier used and on the substrate to be protected.

If the repellent is to be applied to a domestic animal, such as, for example, a dog to repel biting flies (which often are unaffected by conventional repellents) the carrier should be nontoxic to such animals. Especially preferred are those bland carriers commonly accepted as suitable for veterinary, cosmetic and medicinal preparations.

Admixtures with nontoxic and nonirritating alcohols, such as, isopropanol, hexanols, and other commonly used adjuvants are preferred. Some of the useful adjuvants may themselves possess some measure of repellent activity and such combinations may exhibit synegistic effects providing repellent activity beyond that expected from individual components. Also contemplated in certain repellent usage are combinations of the subject alkanolamines with which are mixed useful insecticidally active compounds, such as, for example, natural or synthetic pyrethrins. It is expected that the novel compounds of this invention will afford more economical use of such synergizable substances.

The carrier can be any one or an appropriate mixture of a variety of organic or inorganic liquid, solid, or semisolid carriers or carrier formulations conventionally used in the insect repellent art. Liquid hydrocarbon carriers which are widely used as agricultural carriers, including oils produced by the distillation of coal and/or petrochemical stocks can be emulsified with water and diluted to lower concentrations and used in conventional aerosol spray devices.

A carrier can contain conventional emulsifying agents, such as, for example, a nonionic surfactant, such as the ethylene oxide condensate of octylphenol or an anionic surfactant, such as, for example, an alkali metal salt of an alkylbenzenesulfonic acid. Such emulsifiers permit the composition to be dispersed in and diluted with water for end-use applications.

By way of example, when a terpenyl amine falling within the scope of the formula hereinbefore described is dissolved in paraffin oil containing an emulsifier and such composition is subsequently diluted with water to form an oil-in-water emulsion, the emulsion, when atomized and sprayed in insect-infested areas or in areas which are likely to become insect infested, is a highly effective repellent against such insects and will retain its repellent activity for prolonged periods of time.

Other advantageous organic liquid carriers can include liquid terpene hydrocarbons and terpene alcohols (i.e., α-pinene, dipentene, terpineol, and the like), volatile organic aliphatic and aromatic alcohols, esters, aldehydes, and ketones. Monohydric alcohols, including methyl, ethyl, n-propyl, isopropyl, n-butyl, sec-butyl, and t-butyl alcohols, and polyhydric alcohols, such as ethylene glycol, propylene glycol, and glycerine, may be employed.

It is anticipated that creams and lotions containing the subject hydroxyalkylamines of this invention will be preferred applications for human protection against certain insects including mosquitoes. These preparations which will generally contain other adjuvants commonly used in the art can be applied directly to the skin or exposed body portions in humans or animals or, alternatively, be applied to articles of clothing.

The above described repellents can be formulated in creams and lotions using, by way of example, 0.5 to about 10 parts of the said terpenyl amine in conjunction with about 7 parts dimethyl phthalate and about 3.5 parts magnesium stearate.

Solid carriers which can be used in the compositions include finely divided siliceous minerals, such as, clays, e.g., bentonite, attapulgite, fuller's earth, diatomaceous earth, kaolin, mica, talc, finely divided quartz, etc., as well as synthetically prepared siliceous materials including silica aerogels and precipitates and fume silicas.

Examples of semisolid carriers include petroleum jelly, lanolin, and the like and mixtures of liquid and solid carriers which provide semisolid end products.

The above-described compositions can be employed without further dilution, or can be diluted with suitable liquids or solids to repel common insect pests, such as roaches, termites, beetles, flies, including biting flies, mosquitoes, weevils, moths, ticks, chinch bugs, mites, and the like. Such compositions, when used to contact an insect environment, can effectively repel the insects. By way of example, one advantageous embodiment of a composition of this invention for application to the skin comprises from about 0.1 to 50 percent, preferably 1 to about 25 percent, by weight, of a terpenyl amine compound of this invention. Other formulations include up to 10 parts of the terpenyl amine, 25 parts dimethyl phthalate, 20 parts white wax, and 50 parts peanut oil.

Granaries and silos can be treated with the compositions of this invention prior to grain storage to discourage beetle, weevil, and other insect infestation in the grain to be subsequently stored.

The following examples are intended to illustrate the invention but not to limit the scope thereof, parts and percentages being by weight unless otherwise indicated.

EXAMPLE 1

N-[2-methyl-2-(diethylaminoethoxy)]ethyl digeranylamine

Geranyl chloride (450 g., 2 moles) and 1-amino-2-propanol (150 g., 2 moles) were mixed and heated to 40° C. Temperature was allowed to rise to 75° and maintained for 3 hours. Distillation of the reaction product yielded 1-(digeranylamino)-2-propanol.

The above digeranylaminopropanol was reacted with a molar equivalent of diethylaminoethylchloride hydrochloride solution in the presence of sodium hydroxide. After washing with water N-[2-methyl-2-(diethylaminoethoxy)] ethyl digeranylamine was isolated.

EXAMPLE 2

N-[1,1-dimethyl - 2(diethylaminoethoxy)ethyl]digeranylamine was prepared in a manner similar to the procedure of Example 1 except that 2-amino-2-methyl-1-propanol was used in place of 1-amino-2-propanol.

EXAMPLE 3

N-[1,1-dimethyl - 2 - (diethylaminoethoxy)ethyl]geranylamine was prepared in a manner similar to that of Example 2 except that twice the molar quantity of 2-amino-2-methyl-1-propanol was used.

EXAMPLE 4

Compounds were evaluated as animal protectant spray using the spot-test as described by Roberts et al., "Methods for the Evaluation of Stable Fly Toxicants and Repellents," J. Econ. Entomol 53 (2), pp. 301–3 (1960).

An area 6 inches in diameter on the side of a cow was sprayed with 5 ml. of an acetone solution of the compound. (Materials not soluble in acetone are applied in other solvents.) During the winter months the hair on each area was clipped to ¼–½ inch in length so that the flies can reach the skin to feed, but clipping was not necessary when the animals are in summer coat. Five test areas were spaced on either side of an animal, and were positioned so that cross-contamination is unlikely. The animals were confined in individual stalls which are lighted by sunlamps four hours each day.

Cages, made by soldering screen wire in a mason-jar ring, were used to confine adult stable flies (*Stomoxys calcitrans* (L.)) to the treated spots. Twenty-five 3 to 6-day-old female flies that had not fed for about 18 hours were exposed to each spot for 20 minutes. After exposure the flies were moved to a constant-temperature room for holding at 78° F. and 70% relative humidity.

Repellency was measured by subtracting the percentage of flies that feed from 100%. When more than 20% of the flies feed, the compound was considered to have failed as a repellent.

Compounds were tested for repellency at a 5.0% concentration. Pyrethrins, 0.05% which is effective for 4 days, was used as a standard of comparison. The materials that produce 90% or greater mortality at 5.0% were tested as toxicants at lower concentrations. Compounds were rated as repellents according to the following classification:

A—Effective for 4 or more days
B—Effective for 2–3 days
C—Effective at 1 day
D—Ineffective at 1 day Table 1 shows the extended insect repellent protection provided by two different geranylamines.

Surprisingly, N-[2-methyl - 2 - (diethylaminoethoxy) ethyl]digeranylamine effectively repels biting flies from the skin of a cow for more than 4 days even at application dosages of 5.0 mg. per test area. A similar compound N-[1,1-dimethyl - 2 - (diethylaminoethoxy)ethyl]digeranylamine gives similar insect repellent protection when applied at a concentration of 250 mg. per test area.

TABLE 1
Insect repellents effective against biting flies [1]

| Compound | Amount repellent (mg.) [2] | | | | |
|---|---|---|---|---|---|
| | 500 | 250 | 25 | 12.5 | 5.0 |
| N-[2-methyl-2-(diethylaminoethoxy) ethyl]digeranylamine | A | A | A | A | |
| N-[1,1-dimethyl-2-(diethylaminoethoxy) ethyl]digeranylamine | A | D | | | |

[1] Effectiveness of repellent in days: A, 4 or more; B, 2 to 3; C, 1 day; D, less than 1.
[2] Concentration of active repellent compound expressed in milligrams applied to a 6-inch diameter test area of animal skin.

EXAMPLE 5

Candidate terpenyl amines were evaluated as insect repellents to granary-type beetles employing the confused flour beetle (*Tribolium confusum*) as the indicator species. An active solution containing 1.5 weight percent N-[1,1-dimethyl-2 - (diethylaminoethoxy)ethyl] geranylamine was used to treat two sheets of 50 lb. weight brown kraft paper in order to obtain a concentration of 14 mg. of compound per square foot of paper. The test solutions were applied to the paper sheets and allowed to dry overnight, after which they were cut into strips having a 6-inch by 12-inch length for test purposes.

The long edges of a treated and untreated piece of kraft paper of the same dimensions were joined with transparent tape. Plastic cylinders were placed over the treated and untreated papers so that the joined edges constituted the diameter (3-inch) of the test cylinder. Mineral oil was applied to the walls of the plastic cylinders to force the insects onto the paper surface. Four replicate tests were run for each compound. The number of insects on the treated and untreated surfaces of the paper were recorded at one-hour intervals. The percent repellency was determined by the formula $$\frac{u-t}{u} \times 100$$

were "$u$" is the number of insects on the untreated paper, and "$t$" is the number of insects on the treated paper.

As shown in Table 2, the compound of Example 1 is a highly effective repellent for a typical granary-type beetle affording almost as much protection as another effective repellent used as a Standard.

penyl amine is N-[1,1-dimethyl-2-(diethylaminoethoxy) ethyl]geranylamine.

7. A process for repelling insects from a substrate which comprises applying to said substrate an insect repelling amount between 5 and about 500 mg. per square foot of the composition of claim 1.

8. A process for protecting the skin in a live animal from biting insects which comprises applying an insect repelling amount of the composition of claim 1 to said skin.

9. The process of claim 7 wherein said terpenyl amine is N-[2-methyl-2 - (diethylaminoethoxy)ethyl]digeranylamine.

10. The process of claim 7 wherein said terpenyl amine is N-[1,1-dimethyl - 2 - (diethylaminoethoxy)ethyl]digeranylamine.

11. The process of claim 7 wherein the live animal is human.

12. The process of claim 7 wherein the biting insects are flies.

TABLE 2

Percent repellency of treated kraft paper to *Tribolium confusum*

| Chemical treatment | Rep. Nos. | 1.0 T | 1.0 U | 2.0 T | 2.0 U | 3.0 T | 3.0 U | 4.0 T | 4.0 U | Total count T | Total count U | Percent repellent |
|---|---|---|---|---|---|---|---|---|---|---|---|---|
| N-[dimethyl-2-diethylaminoethoxy)ethyl]geranylamine | 1 | 0 | 10 | 0 | 10 | 1 | 9 | 2 | 8 | | | |
|  | 2 | 0 | 10 | 1 | 9 | 0 | 10 | 4 | 6 | 15 | 145 | 90 |
|  | 3 | 1 | 9 | 1 | 9 | 2 | 8 | 0 | 10 | | | |
|  | 4 | 1 | 9 | 0 | 10 | 2 | 8 | 0 | 10 | | | |
| Untreated | 1 | 7 | 3 | 10 | 0 | 10 | 0 | 0 | 10 | | | |
|  | 2 | 9 | 1 | 4 | 6 | 0 | 10 | 7 | 3 | 84 | 86 | 0 |
|  | 3 | 6 | 4 | 7 | 3 | 0 | 10 | 5 | 5 | | | |
|  | 4 | 7 | 3 | 6 | 4 | 2 | 8 | 4 | 6 | | | |
| 2-N-piperidinoethoxyethyl isobornyl ether (standard) | 1 | 0 | 10 | 1 | 9 | 0 | 10 | 0 | 10 | | | |
|  | 2 | 0 | 10 | 0 | 10 | 4 | 6 | 1 | 9 | 11 | 149 | 93 |
|  | 3 | 1 | 9 | 0 | 10 | 1 | 9 | 0 | 10 | | | |
|  | 4 | 0 | 10 | 2 | 8 | 1 | 9 | 0 | 10 | | | |

NOTE.—T=Treated. U=Untreated.

What is claimed is:

1. An insect repellent composition comprising an inert carrier and from about .01 to 90 weight percent of an acyclic N-[(dialkylaminoalkoxy)alkyl - ]terpenyl amine wherein;
said alkyl group contains 1–6 carbon atoms;
said alkoxy group contains 1–4 carbon atoms; and
said dialkyl portion is two $C_{1-4}$ alkyls.

2. The composition of claim 1 wherein said terpenyl amine is a diterpenyl amine and said alkoxy group is an ethoxy group.

3. The composition of claim 2 wherein said alkyl group is a 2-methylethyl or a 1,1-dimethylethyl group.

4. The composition of claim 1 wherein the said terpenyl amine is N-[2-methyl-2-(diethylaminoethoxy) ethyl]digeranylamine.

5. The composition of claim 1 wherein the said terpenyl amine is N-[1,1-dimethyl-2-(diethylaminoethoxy) ethyl]digeranylamine.

6. The composition of claim 1 wherein the said ter-

References Cited

UNITED STATES PATENTS

| 3,206,511 | 9/1965 | Bindler et al. | 260—570.6 |
| 3,446,843 | 5/1969 | Bordenca et al. | 424—325 |
| 3,472,845 | 10/1969 | Thiele | 424—248 |
| 3,703,554 | 11/1972 | Bordenca | 260—583 |

FOREIGN PATENTS 778,514 6/1957 Great Britain.

OTHER REFERENCES

Love et al., J. Chem. Soc., pp. 3286–92 (1951).

ALBERT T. MEYERS, Primary Examiner

A. J. ROBINSON, Assistant Examiner

U.S. Cl. X.R.

2—4; 117—138.5; 162—161; 424—248, 267, 274, Dig. 10